2,900,412

OXIDATION PROCESS EMPLOYING SULFUR DIOXIDE

William G. Toland, Jr., San Rafael, Calif., assignor to California Research Corporation, San Francisco, Calif., a corporation of Delaware No Drawing. Application August 7, 1958
Serial No. 753,655

6 Claims. (Cl. 260—524)

This application is continuation-in-part of my copending application Serial No. 374,426, filed August 14, 1953, now abandoned, as a continuation-in-part of my thencopending application Serial No. 168,849, filed June 17, 1950 (now abandoned), and relates particularly to the oxidation of lower alkyl aromatic hydrocarbons and lower alkyl benzoic acids.

The oxidation of alkyl aromatic hydrocarbons and their partially oxidized derivatives to produce aromatic carboxylic acids having the carboxyl group or groups directly attached to a nuclear carbon atom presents the organic chemist with a delicate problem of control if high yields of the desired acids are to be obtained. If the conditions under which the oxidation is conducted are too severe, considerable losses of the charging stock are sustained by reason of ring rupture of the aromatic nuclei. If the conditions under which the oxidation is conducted are not sufficiently severe, large proportions of the charging stock are converted to oxidation products which are intermediate between the charging stock and the desired carboxylic acids.

It is an object of this invention to provide a method by which alkyl aromatic hydrocarbons may be converted to aromatic carboxylic acids having the carboxyl group or groups directly attached to the nuclear carbon atom or atoms at high yields.

It has now been found that lower alkyl aromatic hydrocarbons, lower alkyl benzoic acids, and partial oxidation products of such hydrocarbons and acids, for example, alcohols, aldehydes, ketones, and the like, may be oxidized to produce aromatic carboxylic acids by heating these materials in the absence of an inorganic base with water and sulfur dioxide to a temperature in the range from 550° to 800° F. under a superatmospheric pressure, preferably sufficient to maintain a part of the water in liquid phase.

The nature of the reactions occurring in the process of this invention is illustrated by the following equation:

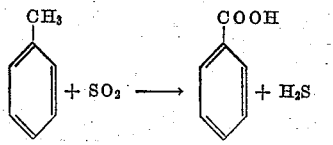

While the equation does not indicate that water participates in the reaction, it is necessary to have water present and for most efficient operation it should be present in large amounts, i.e., 20 to 60 mols of water per mol of organic compound being subjected to oxidation.

U.S. Patent No. 2,610,980 shows the employment of the Willgerodt reaction to oxidize alkyl aromatic hydrocarbons such as xylenes. In this reaction sulfur is the oxidizing agent and 3 atoms of sulfur are required to oxidize one methyl group to a carboxyl group, the carboxyl group being converted in the course of the reaction to the amide. In the process of the present invention a small amount of elemental sulfur not usually exceeding about 6% of the amount which would be required if elemental sulfur were to be provided as the sole oxidizing agent may be introduced into the reaction mixture. 2% to 10% of the amount of sulfur which would suffice to oxidize the feed if sulfur alone were the oxidizing agent may be employed. This small amount of sulfur acts as an initiator and shortens the total time required from completion of the reaction. A small amount of hydrogen sulfide may also be used as an initiator. The addition of from 0.05 to 0.3 mol of either hydrogen sulfide or elemental sulfur per mol of sulfur dioxide to the reaction mixture insures rapid attainment of a high oxidation rate.

The reaction should be conducted at temperatures between about 550° F. and 800° F., preferably from about 600°–700° F. At temperatures below 550° F. the rate of reaction is low. Preferably, the maximum temperature of reaction should be below the critical temperature of water in order that a liquid aqueous phase may be present in the reaction mixture.

The pressure is a dependent variable in the reaction and is usually in the range from about 1000 to 5000 p.s.i.g. The pressure may be controlled during the reaction by bleeding off a portion of the gas formed during the reaction.

Preferably about one mol of $SO_2$ per mol of methyl group to be oxidized should be used in the process of the present invention, as this amount will be sufficient to fully oxidize the methyl group; however, those skilled in the art will recognize that other quantities of $SO_2$ will be operable. Quantities of $SO_2$ from about 0.5 to 5.0 mols per mol of methyl group to be oxidized will be satisfactory.

The invention will be understood upon consideration of the following examples which are provided to illustrate the character of the reactions which produce the desired aromatic carboxylic acids and their derivatives, but which are not intended, in and of themselves, to mark out the limits of the invention.

EXAMPLE 1

2.65 parts by weight of 95% paraxylene, 3.6 parts by weight of sulfur dioxide and 40 parts by weight of water were charged to a bomb reactor which was sealed and heated to 605° to 610° F. for 2½ hours, during which time the pressure attained a maximum of 1720 p.s.i.g. The bomb was cooled and opened. The reaction product was dissolved in sodium hydroxide and filtered; the filtrate was acidified with hydrochloric acid and again filtered. Solid terephthalic acid was recovered as a filter cake. The filtrate was reduced in volume and toluic acid was recovered.

EXAMPLE 2

Example 1 was repeated, but in this case 0.4 part by weight of elemental sulfur was added to the charge to the bomb reactor. In this case the pressure rise was more rapid, indicating a more rapid beginning of the reaction. Terephthalic acid and toluic acid were recovered from the reaction product. When this example was repeated, substituting hydrogen sulfide for the elemental sulfur, the reaction proceeded in the same manner.

EXAMPLE 3

Example 2 was repeated, substituting paratoluic acid for paraxylene. The paratoluic acid was oxidized to terephthalic acid.

EXAMPLE 4

A 4500 cc. autoclave was charged with m-xylene, hydrogen sulfide, and water, heated to reaction temperature, and then $SO_2$ was pumped in. The autoclave was held at about 625° F. for 73 minutes, with shaking, at the end of which time the pressure was 2450 p.s.i.g. The quantities of materials used were:

m-Xylene, 425.0 g. (4.0 mols)
Liquid $SO_2$, 512 g. (8.0 mols) (20 cc./min.)
$H_2O$, 1800 g. (100 mols)
$H_2S$, 15 g. (0.5 mol)

From the products the following materials were isolated:

m-Toluic acid, 11.4 g. (0.084 mol)
Isophthalic acid, 554.0 g. (3.33 mols)

Conversion and yields were:

Conversion—100% of feed
m-Toluic acid yield—2.1% of theory
Isophthalic acid yield—83.3% of theory

EXAMPLE 5

The same equipment and procedure as in Example 4 were used, except that the autoclave was held at about 625° F. for 75 minutes, at the end of which time the pressure was 2625 p.s.i.g. The quantities of materials used were:

p-Xylene, 425 g. (4.0 mols)
Liquid $SO_2$, 512 g. (8.0 mols) (20 cc./min.)
$H_2O$, 1800 g. (100 mols)
$H_2S$, 17 g. (0.5 mol)

From the products the following materials were isolated:

Benzoic acid, 3.5 g. (0.03 mol)
Terephthalic acid, 604 g. (3.64 mols)

Conversion and yields were:

Conversion—100% of feed
Benzoic acid yield—0.8% of theory
Terephthalic acid yield—91.0% of theory

EXAMPLE 6

The same equipment and procedure as in Example 4 were used, except that the autoclave was held at about 635° F. for 40 minutes, at the end of which time the pressure was 2450 p.s.i.g. The quantities of materials used were:

p-Xylene, 213 g. (2.0 mols)
Liquid $SO_2$, 334 g. (5.2 mols) (20 cc./min.)
$H_2O$, 1800 g. (100 mols)
$H_2S$, 20 g. (0.6 mol)

From the products the following material was isolated: phthalic acid, 310.8 g. (1.87 mols).

Conversion and yields were:

Conversion—100% of feed
Terephthalic acid yield—93.5% of theory

EXAMPLE 7

By way of comparison with a system using sulfur and water rather than sulfur dioxide, a 4500 cc. autoclave was charged with sulfur and water, heated to a reaction temperature, and then metaxylene was pumped in. The autoclave was held at about 650° F. for 75 minutes, at the end of which time the pressure was 3150 p.s.i.g. The quantities of materials used were:

m-Xylene, 213 g. (2.0 mols) (5.0 cc./min.)
Sulfur (flowers), 416 g. (13.0 mols)
$H_2O$, 1800 g. (100 mols)

From the products the following materials were isolated:

m-Toluic acid, 38.9 g. (0.282 mol)
Isophthalic acid, 161.7 g. (0.974 mol)

Conversion and yields were:

Conversion—100% of feed
m-Toluic acid yield—14.1% of theory
Isophthalic acid yield—48.7% of theory The following Table I indicates the nature of the oxidation reaction with a variety of organic compounds at temperatures in the range 550° to 800° F., employing the oxidizing agent of the present invention:

Table I

| Material | Reaction Product |
| --- | --- |
| Toluic acids | Phthalic acids. |
| Caproic acid | Carbon dioxide. |
| Tetrahydrofuran | Do. |
| Do | Acetic acid, succinic acid, butyric acid, $CO_2$. |
| Acetophenone | Benzoic acid. |
| Do | Phenylacetic acid. |
| Cyclohexanone | Phenol and $CO_2$. |
| α-methyl naphthalene | α-naphthoic acid. |
| p-tertiary-butyl toluene | p-tertiary-butyl benzoic acid. |
| Toluene | Benzoic acid. |
| Mesitylene | Trimesic acid. |
| m-cymene | Isophthalic acid. |
| Benzyl alcohol | Benzoic acid. |
| 2,3-dimethyl butane | $CO_2$, iso-butyric acid. |
| n-hexane | $CO_2$, lower aliphatic acids. |
| n-octane | Lower aliphatic acids (NE 75-154). |
| 2,2,4-trimethyl pentane | Trimethyl acetic acid. / Trimethyl propionic acid. |
| 2,2,5-trimethyl hexane | Trimethyl acetic acid. / Trimethyl propionic acid. |
| Diamyl sulfide | Mixed acids, predominantly valeric acid (NE 95-110). |
| t-butyl p-xylene | t-butyl terephthalic acid. |
| Di-isobutylene | Trimethyl acetic acid. / Trimethyl propionic acid. |
| Methanol | $CO_2$. |
| Dodecene (propylene polymer) | Aliphatic acids (NE 234.8). |
| t-butyl meta-xylene | t-butyl isophthalic acid. |
| Sucrose | Acetic acid, $CO_2$. |
| n-butane | Do. |
| Benzene | CO, $CO_2$. |
| Methane | CO, $CO_2$. |
| Benzylamine | Benzoic acid. |

The process of the present invention has numerous advantages over other oxidation systems utilizing sulfur or compounds containing sulfur. Systems utilizing ammonium salts and/or ammonia yield amides that must be subjected to either acid-catalyzed hydrolysis, with attendant corrosion problems, or to a base hydrolysis followed by acidification, the hydrolysis in either case being difficult and costly. Such hydrolysis operations are unnecessary with the process of the present invention. Systems using sulfur as such present a difficult problem in materials handling that is not present with sulfur dioxide. While sulfur dioxide is readily transported either as a liquid or as a gas, sulfur is difficult to pump because of its high melting point and viscosity.

Those skilled in the art will perceive numerous other advantages available with the process of the present invention, for example, in addition to the usual pressure control means used in continuous systems, the sulfur dioxide pumping rate can be adjusted to balance hydrogen sulfide formation and thus to prevent a pressure build-up during oxidation if so desired. Those skilled in the art also will note that the oxidation efficiency of one pound of sulfur dioxide in the present process is equivalent to that of 1.5 pounds of sulfur in other processes, i.e., 1 mol of $SO_2$ has the oxidizing potential of 3 mols of sulfur. In the $SO_2$ system, the absence of a cation, such as is present in sulfite and bisulfite systems, has been found to be advantageous for several reasons, including the fact that in the cation-free system the reaction progresses more readily and completely, and the fact that higher temperatures may be used if desired.

What is claimed is:

1. A process for oxidizing a material of the group consisting of methyl-substituted aromatic hydrocarbons and aromatic carboxylic acids having at least one nuclear hydrogen replaced by a methyl group, which comprises heating said material in the absence of an inorganic base with water and sulfur dioxide to a temperature in the range from 550° to 800° F. under a superatmospheric pressure.

2. The method as defined in claim 1, wherein said material is a xylene.

3. The method as defined in claim 1, wherein said material is a toluic acid.

4. A process for oxidizing a material of the group consisting of methyl-substituted aromatic hydrocarbons and aromatic carboxylic acids having at least one nuclear hydrogen replaced by a methyl group, which comprises heating said material in the absence of an inorganic base with a substantial molar excess of water, about 0.5 to 5 mols of sulfur dioxide per mol of methyl group contained in said material and about 0.05 to 0.3 mol of a sulfur compound of the group consisting of water-soluble sulfides and elemental sulfur per mol of methyl group contained in said material to a temperature in the range from 600° to 700° F. under a superatmospheric pressure sufficient to maintain a part of the water in liquid phase.

5. The method as defined in claim 4, wherein said material is a xylene.

6. The method as defined in claim 4, wherein said material is a toluic acid.

No references cited.